United States Patent
Song et al.

(10) Patent No.: US 11,573,733 B2
(45) Date of Patent: Feb. 7, 2023

(54) DATA STORAGE DEVICE AND DATA STORAGE SYSTEM

(71) Applicant: Samsung Electronics Co., Ltd., Suwon-si (KR)

(72) Inventors: Byung June Song, Suwon-si (KR); Song Ho Yoon, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 571 days.

(21) Appl. No.: 16/414,129

(22) Filed: May 16, 2019

(65) Prior Publication Data
US 2020/0142631 A1   May 7, 2020

(30) Foreign Application Priority Data
Nov. 5, 2018 (KR) .......................... 10-2018-0134091

(51) Int. Cl.
*G06F 3/06* (2006.01)
*G06F 21/60* (2013.01)

(52) U.S. Cl.
CPC .......... *G06F 3/0658* (2013.01); *G06F 3/0604* (2013.01); *G06F 3/0659* (2013.01); *G06F 3/0679* (2013.01); *G06F 21/602* (2013.01)

(58) Field of Classification Search
CPC ..... G06F 3/0658; G06F 3/0604; G06F 3/0679
See application file for complete search history.

(56) References Cited

U.S. PATENT DOCUMENTS

| 8,832,354 B2 | 9/2014 | Sokolov et al. |
| 9,317,461 B2 | 4/2016 | Sokolov et al. |
| 9,563,382 B2 | 2/2017 | Hahn et al. |
| 9,836,219 B2 | 12/2017 | Kim et al. |
| 10,007,311 B2 | 6/2018 | Raghu et al. |

(Continued)

FOREIGN PATENT DOCUMENTS

| KR | 10-1030617 B1 | 4/2011 |
| KR | 10-2016-0131870 A | 11/2016 |
| KR | 10-2017-0090262 A | 8/2017 |

OTHER PUBLICATIONS

Jeong, et al. "Improving Flash Storage Performance by Caching Address Mapping Table in Host Memory," S/W Development Team, Memory Business, Samsung Electronics Co., Ltd. pp. 1-6.

(Continued)

*Primary Examiner* — Baboucarr Faal
(74) *Attorney, Agent, or Firm* — Harness, Dickey & Pierce, P.L.C.

(57) ABSTRACT

A data storage device including a first non-volatile memory configured to store data, and a device controller configured to control the first non-volatile memory may be provided, and wherein the device controller may be configured to receive a data read command including a first logical address of the first non-volatile memory, a first physical address corresponding to the first logical address, and first status information of the first non-volatile memory corresponding to the first physical address, determine a first read level, using the first status information included in the data read command, and apply a voltage of the first read level to a first word line of the first non-volatile memory corresponding to the first physical address to read data.

11 Claims, 17 Drawing Sheets

(56) References Cited

U.S. PATENT DOCUMENTS

| | | |
|---|---|---|
| 10,007,433 B2 | 6/2018 | Hahn |
| 10,025,535 B2 | 7/2018 | Frickey, III et al. |
| 2013/0124784 A1 | 5/2013 | Woo et al. |
| 2017/0038974 A1 | 2/2017 | Keshava |
| 2017/0192902 A1 | 7/2017 | Hwang et al. |
| 2018/0039429 A1 | 2/2018 | Wu et al. |
| 2018/0262567 A1* | 9/2018 | Klein ................ G06F 3/0631 |

OTHER PUBLICATIONS

Extended European Search Report dated Mar. 10, 2020 issued in corresponding European Patent Application No. 19207036.5-1203.
Korean Office Action dated Oct. 31, 2022 issued in Korean Patent Application No. 10-2018-0134091.

* cited by examiner

DATA STORAGE DEVICE AND DATA STORAGE SYSTEM

CROSS-REFERENCE TO RELATED APPLICATION

This application claims priority under 35 U.S.C. § 119 to Korean Patent Application No. 10-2018-0134091, filed on Nov. 5, 2018 in the Korean Intellectual Property Office, the disclosure of which is incorporated by reference herein in its entirety.

BACKGROUND

1. Field

The present disclosure relates to data storage devices and/or data storage systems.

2. Description of the Related Art

In order to read data stored in a storage device including a flash memory, a host may transmit a logical address of the data to be read to the storage device. Thus, the storage device may convert a logical address received from the host into a physical address for accessing a flash memory using, for example, a flash translation layer (FTL). At this time, the storage device may read the data and provide the data to the host by applying a read voltage to a word line corresponding the translated physical address.

However, depending on the state of the flash memory, even if the storage device applies a predetermined read voltage, a read fail may occur. Therefore, the storage device determines the read level based on the state of the flash memory, and applies the determined read level voltage to the word line corresponding to the physical address. At this time, information on the state of the flash memory is managed by the storage device, and as the degree of integration and densification of the flash memory increases, an amount of such status information may increase. If such status information are managed in an internal memory of the storage device, the capacity of the internal memory of the storage device is increased, thereby resulting in an increase in cost. On the other hand, if such status information are managed by the non-volatile memory included in the storage device, it takes relatively long time to load the status information, and performance of the storage device may degrade.

SUMMARY

Some aspects of the present disclosure provide data storage devices and/or systems capable of reducing or minimizing temporal and/or physical costs, while maintaining performance.

According to an example embodiment of the present disclosure, a data storage device includes a first non-volatile memory configured to store data and a device controller configured to control the first non-volatile memory. The device controller may be configured to: receive a data read command including a first logical address of the first non-volatile memory, a first physical address corresponding to the first logical address, and first status information of the first non-volatile memory corresponding to the first physical address, determine a first read level using the first status information included in the data read command, and apply a voltage of the first read level to a first word line of the first non-volatile memory corresponding to the first physical address to read data.

According to an example embodiment of the present disclosure, a data storage device includes a first non-volatile memory configured to store data, a first internal memory configured to store a first logical address of the first non-volatile memory, a first physical address corresponding to the first logical address, and first status information of the first non-volatile memory corresponding to the first physical address, and a device controller configured to control the first non-volatile memory and the first internal memory. The device controller may be configured to: program data in the first non-volatile memory by receiving a data program command on the first non-volatile memory, update the first physical address and the first status information stored in the first internal memory, and provide the updated first physical address and the updated first status information to outside.

According to an example embodiment of the present disclosure, a data storage device includes a first non-volatile memory configured to store data, a first internal memory configured to store a first logical address of the first non-volatile memory, a first physical address corresponding to the first logical address, first status information of the first non-volatile memory corresponding to the first physical address, and first signature information on validity of the first logical address, the first physical address and the first status information, and a device controller configured to control the first non-volatile memory and the first internal memory. The device controller may be configured to receive a first data read command including first metadata and a second logical address of the first non-volatile memory, decrypt the first metadata to generate a second physical address corresponding to the second logical address, second status information of the first non-volatile memory corresponding to the second physical address, and second signature information, determine a data read level based on the first signature information and the second signature information on validity of the first metadata, and read data stored in the first non-volatile memory using the determined data read level.

According to an example embodiment of the present disclosure, a data storage system includes a host including a host controller, and a data storage device connected to the host and including a first non-volatile memory and a device controller. The host controller may be configured to transmit a data read command including a first logical address of the first non-volatile memory and first metadata corresponding to the first logical address to the data storage device in response to a data read request. The device controller may be configured to decrypt the first metadata included in the data read command to generate a first physical address corresponding to the first logical address and first status information of the first non-volatile memory corresponding to the first physical address, determine a first read level using the first status information, and read data stored in the first non-volatile memory, using the first read level.

However, aspects of the present disclosure are not restricted to the ones set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of the present disclosure will become more apparent by describing in detail some example embodiments thereof with reference to the attached drawings.

DETAILED DESCRIPTION

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Figure 1:
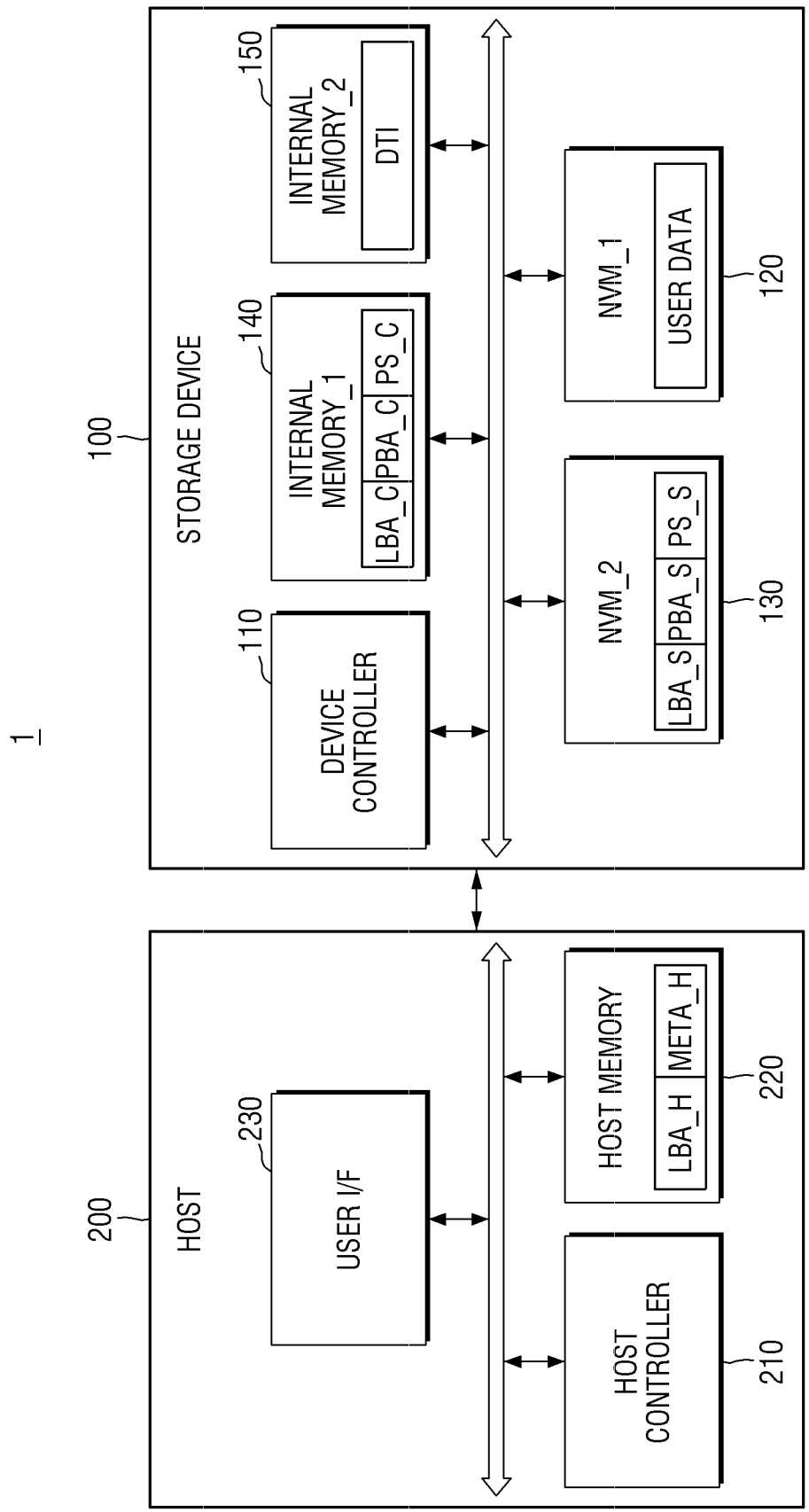
FIG. 1 is a diagram illustrating a data storage system according to an example embodiment.

FIG. 1 is a diagram illustrating a data storage system according to an example embodiment. Referring to FIG. 1, a data storage system 1 may include a data storage device 100 and a host 200.

The data storage system 1 may be implemented as, but is not limited to, for example, a personal computer (PC), a workstation, a data center, an internet data center (IDC), a direct attached storage (DAS) system, a storage area network (SAN) system, a network attached storage (NAS) system, a redundant array of inexpensive disks, a redundant array of independent disks (RAID) system, or a mobile device.

Further, the mobile device may be implemented as, but is not limited to, for example, a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or a portable navigation device (PND), a handheld game console, a mobile internet device (MID), a wearable computer, an internet of things (IoT) device, an internet of everything (IoE) device, a drone, or an e-book.

The data storage device 100 may include a device controller 110, a first non-volatile memory 120, a second non-volatile memory 130, a first internal memory 140 and a second internal memory 150.

The device controller 110 may control the overall operations inside the data storage device 100. For example, the device controller 110 may perform operations of programming, reading or erasing the data requested by a host 200 on the first non-volatile memory 120. In another example, the device controller 110 may determine a read level to be provided to the first non-volatile memory 120. In some example embodiments, the data storage device 100 may further include a buffer memory (not shown). However, example embodiments are not limited thereto, and the device controller 110 may control various operations other than the above-described operation. Examples of some specific contents will be described later.

The first non-volatile memory 120 may store a user data (USER DATA). For example, the first non-volatile memory 120 may include, but is not limited to, a flash memory, a resistive RAM (RRAM), a phase change memory (PRAM), a magneto-resistive memory (MRAM), a ferroelectric memory (FRAM), a spin injection magnetization inversion memory (Spin STT-RAM), or the like.

The second non-volatile memory 130 may store a first logical address LBA_S of the first non-volatile memory 120, a first physical address PBA_S corresponding to the first logical address LBA_S, and a first status information PS_S of the first non-volatile memory 120 corresponding to the first physical address PBA_S. The first status information PS_S may be, for example, physical status information on a memory page of the first non-volatile memory 120 corresponding to the first physical address PBA_S. In another example, the first status information PS_S may be physical status information on a memory block of the first non-volatile memory 120 corresponding to the first physical address PBA_S. In other words, the first status information PS_S may be status information on a specific storage region of the first non-volatile memory 120 corresponding to the first physical address PBA_S. The second non-volatile memory 130 may include, but is not limited to, for example, a flash memory, an RRAM, a PRAM, an MRAM, a FeRAM, a Spin STT-RAM, or the like.

According to some example embodiments, the first non-volatile memory 120 may be a flash memory and the second non-volatile memory 130 may be a magneto-resistive memory. According to some other example embodiments, the first non-volatile memory 120 may be a flash memory using a multi-level cell MLC, and the second non-volatile memory 130 may be a flash memory using a single level cell SLC. Although FIG. 1 illustrates a state in which the first non-volatile memory 120 and the second non-volatile memory 130 are separated from each other, example embodiments are not limited thereto. According to some example embodiments, the first non-volatile memory 120 and the second non-volatile memory 130 may be implemented in a single memory device. For example, the first non-volatile memory 120 may be a multi-level cell MLC region of a flash memory, and the second non-volatile memory 130 may be a single level cell SLC region of the same flash memory.

The first internal memory 140 may store a second logical address LBA_C of the first non-volatile memory 120, a second physical address PBA_C corresponding to the second logical address LBA_C, and a second status information PS_C of the first non-volatile memory 120 corresponding to the second physical address PBA_C. Since the second status information PS_C is similar to the first status information PSS described above, the description thereof will be not be provided. The first internal memory 140 may include an SRAM, a DRAM, an SDRAM, etc., but example embodiments are not limited thereto. For example, the first internal memory 140 may be an SRAM.

The second internal memory 150 may store a read level determination information DTI used to determine the read level to be provided to the first non-volatile memory 120. The read level determination information DTI may be relationship information between the status information of the first non-volatile memory 120 and a read voltage variation corresponding thereto. A person having ordinary skill in the technical field of the present disclosure may implement the read level determination information DTI in various forms. For example, the read level determination information DTI may be a lookup table. The second internal memory 150 may include, but is not limited to, an SRAM, a DRAM, an SDRAM, or the like, or may include a ROM, a PROM, an EPROM, an EEPROM, a flash memory device, a PRAM, a MRAM, a RRAM, a FRAM, or the like. For example, the second internal memory 150 may be an SRAM or a ROM.

FIG. 1 illustrates a state in which the device controller 110 and the first internal memory 140 are separated from each other, but example embodiments are not limited thereto. For example, the first internal memory 140 may be an internal memory of the device controller 110. Further, FIG. 1 illustrates a state in which the device controller 110, the first non-volatile memory 120, the second non-volatile memory 130, the first internal memory 140, and the second internal memory 150 of the data storage device 100 are connected via the bus, respectively, but example embodiments are not limited thereto. For example, the first non-volatile memory 120, the second non-volatile memory 130, the first internal memory 140 and the second internal memory 150 may be directly connected to the device controller 110, respectively. A person having ordinary skill in the technical field of the present disclosure may implement the data storage device 100 in various ways, without departing from the inventive concepts of the present disclosure.

The host 200 may include a host controller 210, a host memory 220, and a user interface 230.

The host controller 210 may control the overall operations inside the host 200. For example, the host controller 210 may transmit a program instruction (PROGRAM CMD), a read command (READ CMD), or an erase command (erase CMD) of data to the data storage device 100, in response to a request from the user interface 230. In some example embodiments, the host 200 may further include a buffer memory (not shown). However, example embodiments are not limited thereto, and the host controller 210 may control various operations other than the above-described operations. Some examples of specific contents will be described later.

The host memory 220 may store the third logical address LBA_H of the first non-volatile memory 120 included in the data storage device 100 and the first metadata META_H. The host memory 220 may include a DRAM, an SRAM, an SDRAM, etc., but example embodiments are not limited thereto. For convenience of explanation, the following description will be made assuming that the host memory 220 is a DRAM. However, a person having ordinary knowledge in the technical field of the present disclosure may implement the host memory 220, using various memories. According to some example embodiments, a storage capacity of the host memory 220 may be greater than or equal to a storage capacity of the first internal memory 140, and example embodiments are not limited thereto. For an illustrative description of the first metadata META_H, reference is made to FIG. 2.

Figure 2:
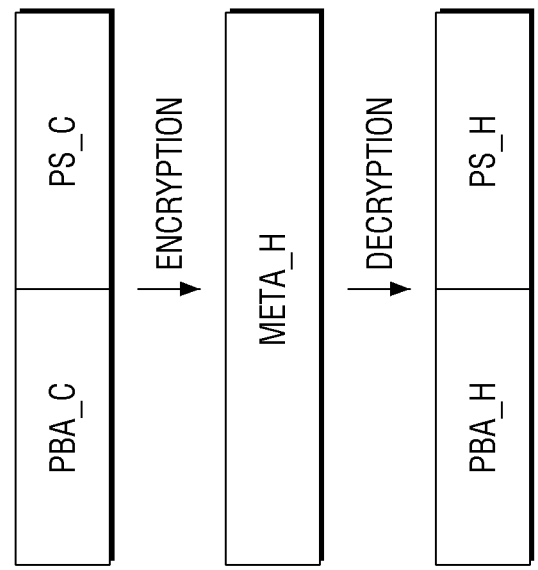
FIG. 2 is a diagram for explaining a relation between the first metadata, the second physical address, the second status information, the third physical address and the third status information according to an example embodiment.

FIG. 2 is a diagram for explaining a relation between the first metadata, the second physical address, the second status information, the third physical address and the third status information according to an example embodiment.

Referring to FIGS. 1 and 2, the device controller 110 may encrypt the second physical address PBA_C and the second status information PS_C to generate the first metadata META_H. For example, the device controller 110 may scramble the second physical address PBA_C and the second status information PS_C to generate the first metadata META_H. Meanwhile, the device controller 110 may decrypt the first metadata META_H from the host 200 to generate the third physical address PBA_H and the third status information PS_H corresponding to the third physical address PBA_H. For example, the device controller 110 may descramble the first metadata META_H to generate the third physical address PBA_H and the third status information PS_H. In other words, the first metadata META_H may be the encrypted second physical address PBA_C and the second status information PS_C, and the third physical address PBA_H and the third status information PS_H may be the decrypted first metadata META_H. That is, the first metadata META_H may include the second physical address PBA_C and the second status information PS_C, or may include the third physical address PBA_H and the third status information PS_C. This will be explained with reference to FIG. 1 again.

The data storage device 100 and the host 200 according to some example embodiments may be connected to each other via a UFS (Universal Flash Storage), an SCSI (Small Computer System Interface), an SAS (Serial Attached SCSI), an SATA (Serial Advanced Technology Attachment), a PCIe (Peripheral Component Interconnect Express), an eMMC (embedded MultiMediaCard), a FC (Fiber Channel), an ATA (Advanced Technology Attachment), an IDE (Integrated Drive Electronics), a USB (Universal Serial Bus), or an IEEE 1394 (Firewire). However, example embodiments are not limited thereto, and are also applicable to an arbitrary interface that enables data to be sent and received between the host 200 and the data storage device 100.

Hereinafter, for clarity and convenience of explanation of the present inventive concepts, the description will be provided on the assumption that the host 200 and the data storage device 100 are connected to each other via the UFS electrical interface, the host 200 is a UFS host, and the data storage device 100 is a UFS memory device. For example, the data storage system 1 may adopt a MIPI UniPro or a MIPI M-PHY. However, example embodiments are not limited thereto, and may be applied to an arbitrary storage system using an arbitrary interface, including the above-mentioned electrical interface.

Figure 3:
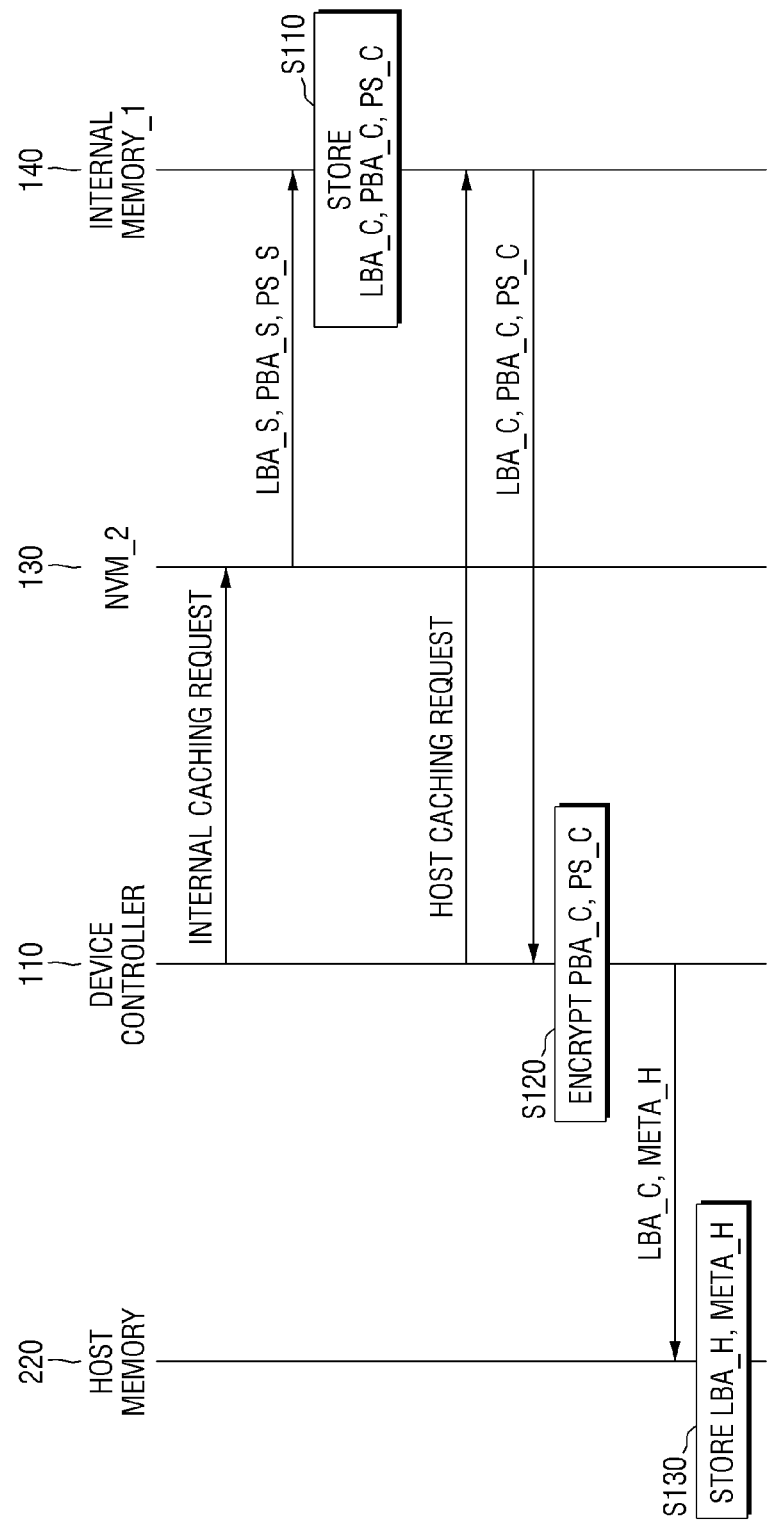
FIG. 3 is a diagram illustrating the movement of data between the host memory, the first internal memory, and the second non-volatile memory according to an example embodiment.

FIG. 3 is a diagram illustrating the movement of data between the host memory, the first internal memory, and the second non-volatile memory according to an example embodiment. For convenience of explanation, although FIG. 3 illustrates a state in which the operation of some constituent elements is omitted, the description will be provided with reference to FIG. 1 to complement this.

Referring to FIGS. 1 and 3, the device controller 110 may provide an internal caching request to the second non-volatile memory 130. In response to the internal caching request, the second non-volatile memory 130 may provide some of the first logical address LBA_S, the first physical address PBA_S, and the first status information PS_S stored in the second non-volatile memory 130 to the first internal memory 140. The first internal memory 140 may receive and store at least some of the first logical address LBA_S, the first physical address PBA_S, and the first status information PS_S from the second non-volatile memory 130 (S110). At least some of the first logical address LBA_S, the first physical address PBA_S, and the first status information PS_S stored in the first internal memory 140 may be referred to as a second logical address LBA_C, a second physical address PBA_C, and a second status information PS_C, respectively, for convenience of explanation.

The device controller 110 may provide a host caching request to the first internal memory 140 for performing the host caching of the second logical address LBA_C, the second physical address PBA_C, and the second status information PS_C. The first internal memory 140 may provide the stored second logical address LBA_C, the second physical address PBA_C, and the second status information PS_C to the device controller 110. The device controller 110 may encrypt the received second physical address PBA_C and the second status information PS_C (S120). In other words, the device controller 110 may generate the first metadata META_H by encrypting the second physical address PBA_C and the second status information PS_C. The device controller 110 may provide the received second logical address LBA_C and the generated first metadata META_H to the host memory 220. The host 200 may receive the second logical address LBA_C and the first metadata META_H and store them in the host memory 220 (S130). The second logical address LBA_C provided to the host 200 may be referred to as a third logical address LBA_H for convenience of explanation.

In some example embodiments, for convenience of explanation, caching to the first internal memory 140 is referred to as internal caching, and caching to the host memory 220 is referred to as host caching. However, example embodiments are not limited to such terms.

Figure 4:
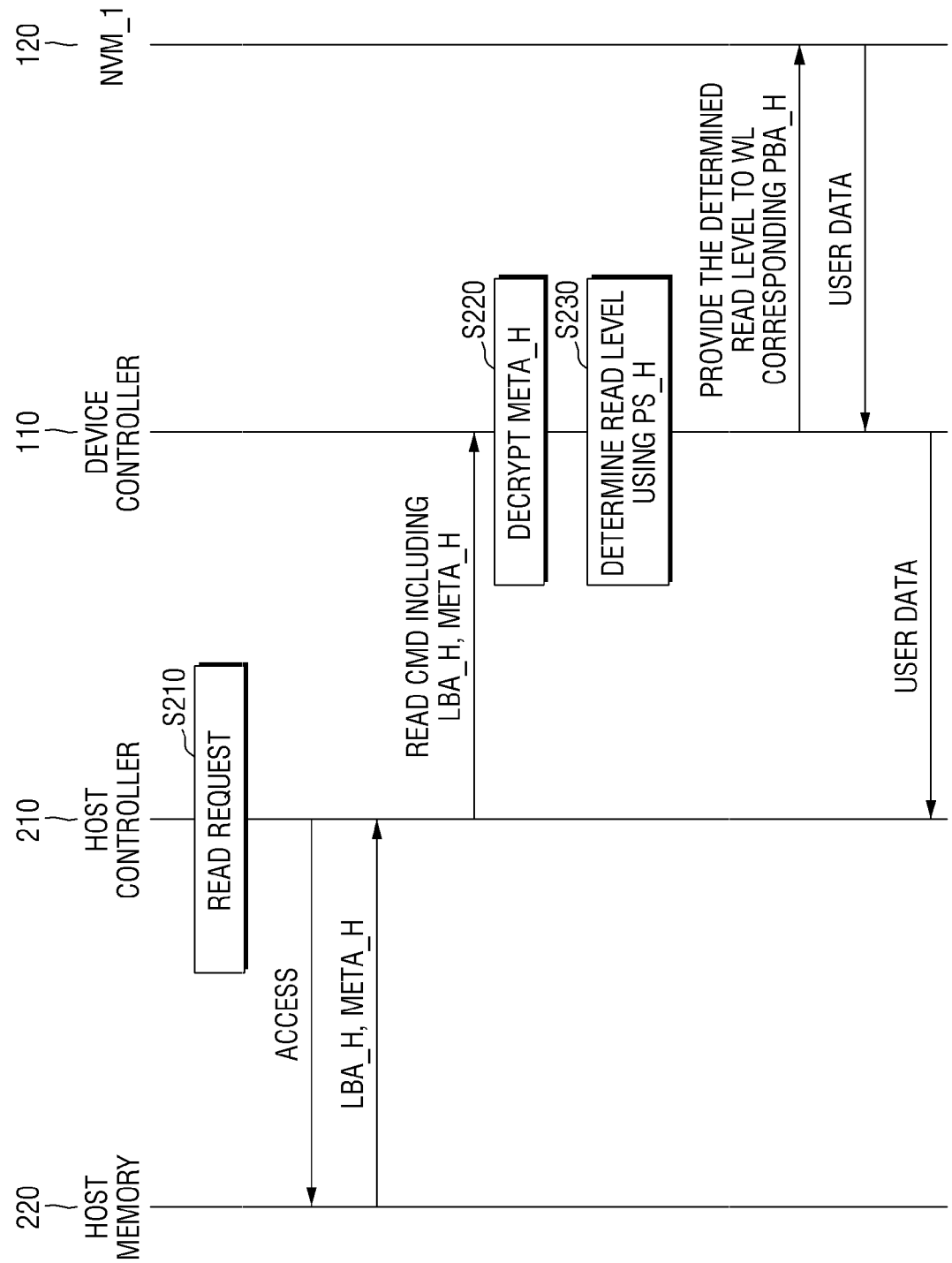
FIG. 4 is a diagram for explaining a data read operation of the data storage system according to an example embodiment.

FIG. 4 is a diagram for explaining a data read operation of the data storage system according to an example embodiment. For convenience of explanation, although FIG. 4 illustrates a state in which the operation of some constituent elements is omitted, the description will be provided with reference to FIG. 1 to complement this.

Referring to FIGS. 1 and 4, the host controller 210 may receive a data read request (S210). For example, the host controller 210 may receive a data read request from the user interface 230. Upon receiving the data read request, the host controller 210 may access the host memory 220 to load the third logical address LBA_H and the first metadata META_H. The host controller 210 may provide a data read command (READ CMD) including the third logical address LBA_H and the first metadata META_H to the data storage device 100. The data read command (READ CMD) including the third logical address LBA_H and the first metadata META_H may be provided to the device controller 110.

The device controller 110 may decrypt the first metadata META_H included in the received data read command (S220). In other words, the device controller 110 may decrypt the first metadata META_H to generate the third physical address PBA_H and the third status information PS_H. The device controller 110 may determine the first read level to be applied to the word line of the first non-volatile memory 120 corresponding to the third physical address PBA_H, using the third status information PS_H (S230). For example, the device controller 110 may load the read level determination information DTI stored in the second internal memory 150 and determine the first read level, using the read level determination information DTI and the third status information PS_H.

The device controller 110 may read the user data (USER DATA) stored in the third physical address PBA_H of the first non-volatile memory 120, using the determined first read level. For example, the device controller 110 may read the user data (USER DATA) stored in the third physical address PBA_H of the first non-volatile memory 120, by applying the determined voltage of the first read level to the word line of the first non-volatile memory 120 corresponding to the third physical address PBA_H. The device controller 110 may provide the read user data (USER DATA) to the host 200. For an illustrative description of the data read operation, reference is made to FIGS. 5 and 6.

Figure 5:
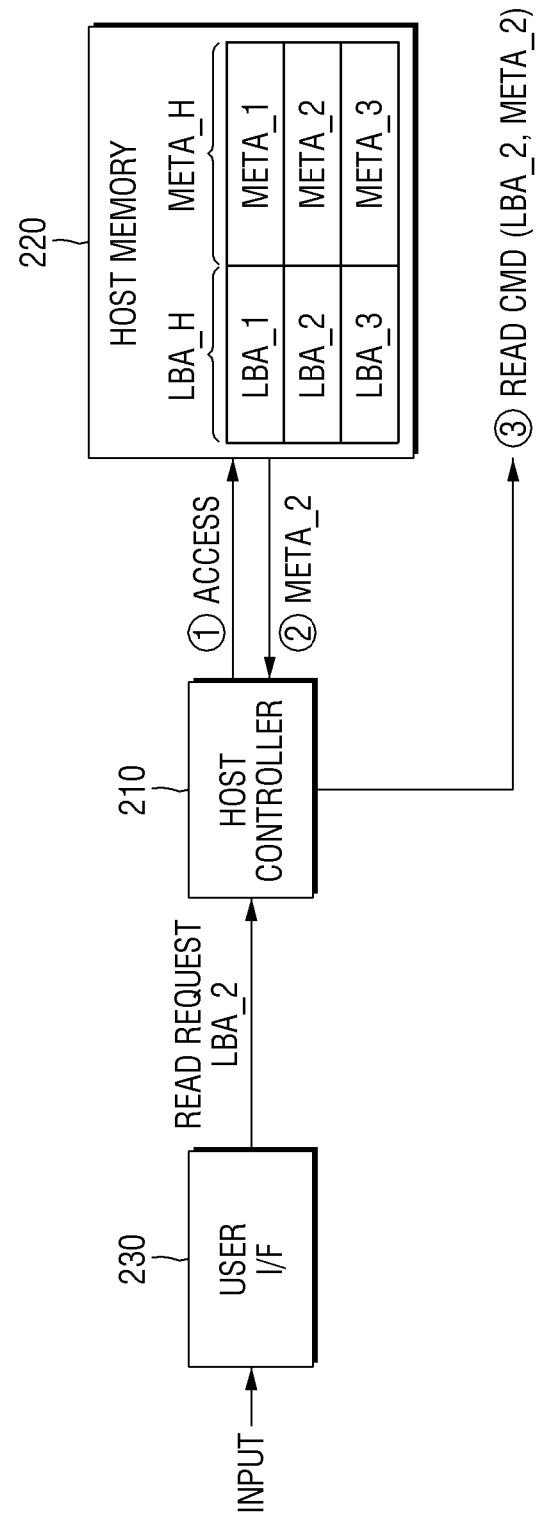
FIGS. 5 and 6 are diagrams for explaining a data read operation of the data storage system according an example embodiment.
Figure 6:
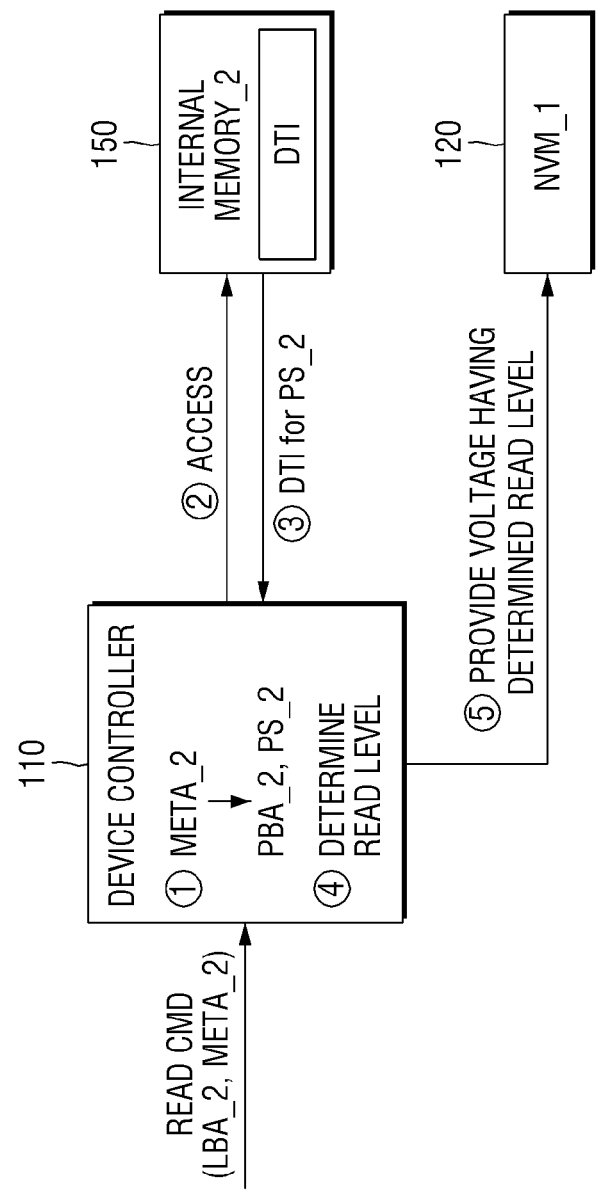

FIGS. 5 and 6 are diagrams for explaining a data read operation of the data storage system according to an example embodiment. For the sake of convenience of explanation, although FIGS. 5 and 6 illustrates a state in which the operation of some constituent elements is omitted, the description will be provided with reference to FIG. 1 to complement this.

Referring to FIG. 5, the host memory 220 may store the third logical address LBA_H and the first metadata META_H. The third logical address LBA_H may include a plurality of logical addresses, for example, a logical address LBA_1, a logical address LBA_2 and a logical address LBA_3. Similarly, the first metadata META_H may include a plurality of metadata, for example, metadata META_1, metadata META_2 and metadata META_3. The metadata META_1, the metadata META_2 and the metadata META_3 may correspond to the logical address LBA_1, the logical address LBA_2 and the logical address LBA_3, respectively.

Referring to FIGS. 1 and 5, input of a data read may be provided to the user interface 230 of the host 200. The user interface 230 may request the host controller 210 to read the logical address LBA_2.

When the host controller 210 receives the read request of the logical address LBA_2, the host controller 210 may access the host memory 220 to load the metadata META_2 corresponding to the logical address LBA_2.

After loading the metadata META_2, the host controller 210 may provide the data read command (READ CMD) including the logical address LBA_2 and the metadata META_2 to the data storage device 100.

Referring to FIGS. 1 and 6, the device controller 110 may receive the data read command (READ CMD) including the logical address LBA_2 and the metadata MET A_2.

The device controller 110 may decrypt the received metadata META_2 to generate the physical address PBA_2 and the status information PS_2. The physical address PBA_2 may correspond to the logical address LBA_2, and the status information PS_2 may be status information on the storage region of the first non-volatile memory 120 corresponding to the physical address PBA_2.

The device controller 110 may access the second internal memory 150 to load the read level determination information DTI on the status information PS_2.

The device controller 110 may determine the read level for reading the data stored in the physical address PBA_2 of the first non-volatile memory 120, using the status information PS_2, and the read level determination information DTI on the status information PS_2.

The device controller 110 may provide the determined read level voltage to the first non-volatile memory 120 and read the data. In other words, the device controller 110 may read the data stored in the physical address PBA_2, by applying the voltage of the determined read level to the word line of the first non-volatile memory 120 corresponding to the physical address PBA_2.

Figure 7:
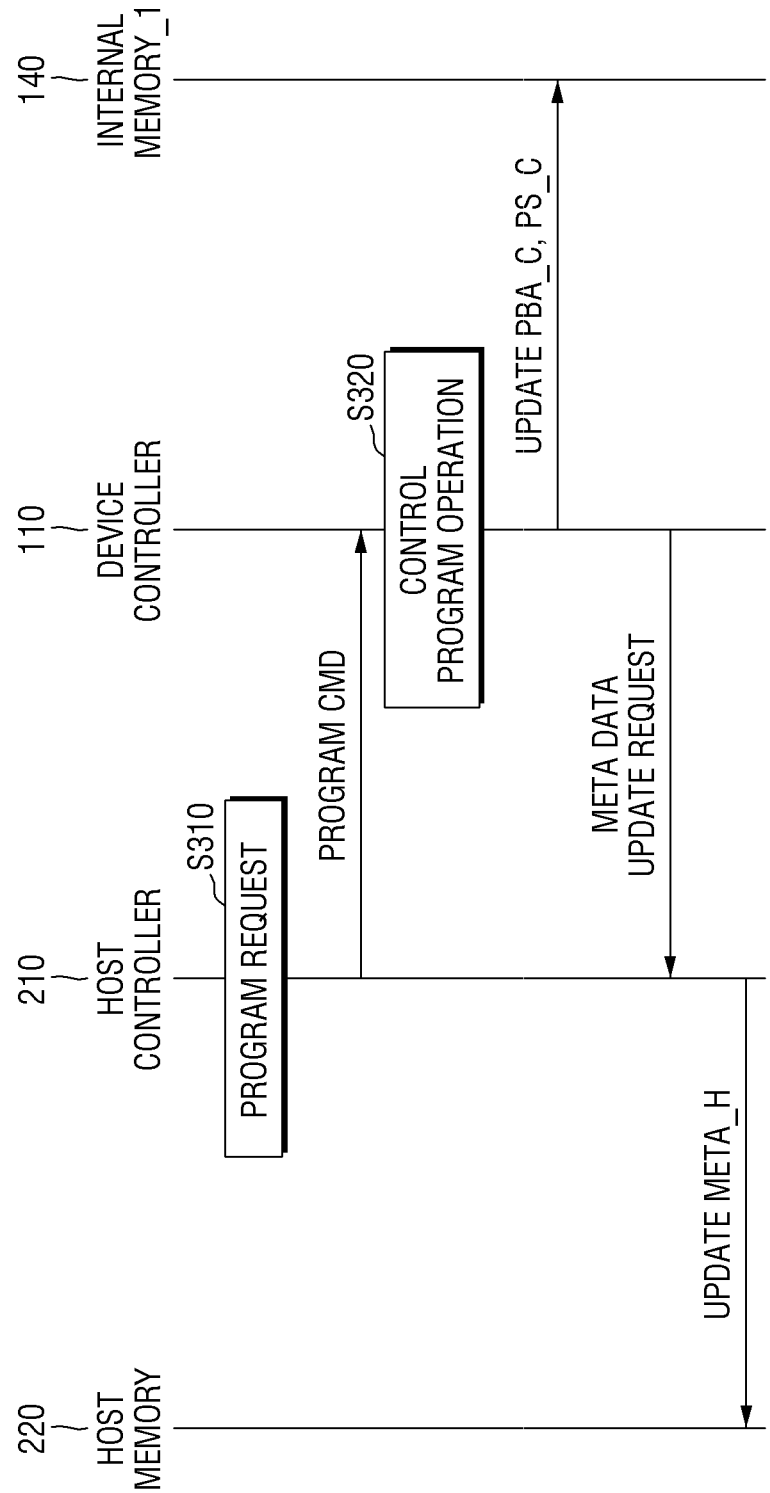
FIG. 7 is a diagram illustrating a data program operation of the data storage system according to an example embodiment.

FIG. 7 is a diagram illustrating a data program operation of the data storage system according to an example embodiment. For the sake of convenience of explanation, although FIG. 7 illustrates a state in which the operation of some constituent elements is omitted, the description will be provided with reference to FIG. 1 to complement this.

Referring to FIGS. 1 and 7, the host controller 210 may receive a data program request (S310). For example, the host controller 210 may receive the data program request from the user interface 230. Upon receiving the request for data program, the host controller 210 may provide the data program command (PROGRAM CMD) to the data storage device 100.

The device controller 110 may receive the data program command (PROGRAM CMD), and may control the program operation of the data storage device 100 (S320). For example, the device controller 110 may program the user data (USER DATA) to the unallocated physical address of the first non-volatile memory 120.

The device controller 110 may update the second physical address PBA_C and the second status information PS_C stored in the first internal memory 140 to the physical address in which the data is programmed, and the status information corresponding thereto. For example, the device controller 110 may invalidate the second physical address PBA_C and the second status information PS_C stored in the first internal memory 140, and may update the physical address in which the data is programmed, and the corresponding status information to the second physical address PBA_C and the second status information PS_C, respectively.

The device controller 110 may request the host 200 to update the metadata. For example, the device controller 110 may generate metadata by encrypting the updated second physical address PBA_C and the updated second status information PS_C. The generated metadata may be transmitted to the host 200 together with the update request of metadata.

According to some example embodiments, the device controller 110 may request the host 200 to update the metadata based on a particular situation. For illustrative explanation, reference is made to FIG. 8.

Figure 8:
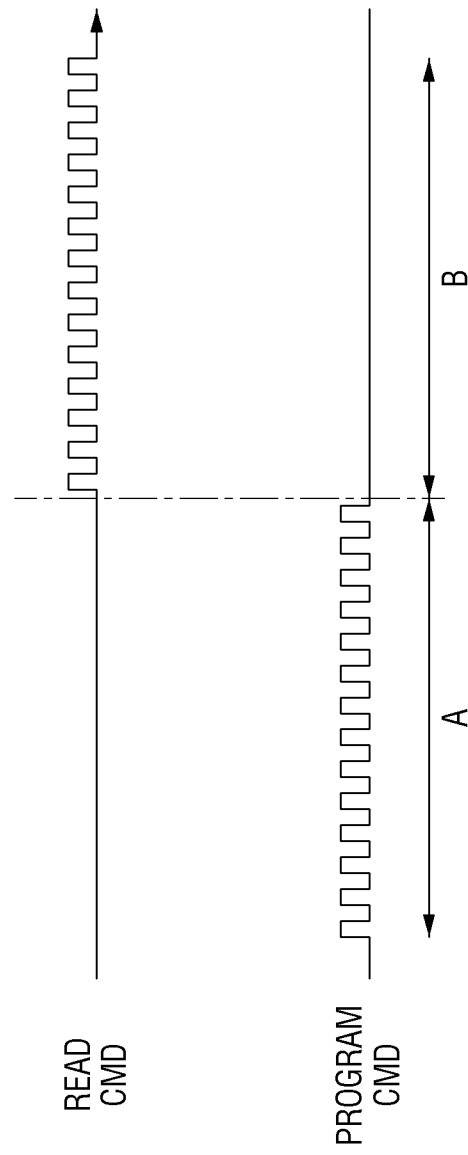
FIG. 8 is a diagram for explaining a situation in which the device controller requests a host to update the metadata, according to an example embodiment.

FIG. 8 is a diagram for explaining a situation in which the device controller requests a host to update the metadata according to an example embodiment.

Referring to FIGS. 1 and 8, the device controller 110 may distinguish a first period A in which the program command (PROGRAM CMD) is received and a second period B in which the read command (READ CMD) is received. For example, the device controller 110 may not request the host 200 to update the metadata during the first period A. For example, the device controller 110 may request the host 200 to update the metadata during the second period B. Because the data is programmed and the second physical address PBA_C and the second status information PS_C stored in the first internal memory 140 are repeatedly updated during the first period A, the device controller 110 may not request update of metadata to the host 200 during the first period A. On the other hand, since the second physical address PBA_C and the second status information PS_C stored in the first internal memory 140 are not updated during the second period B, the device controller 110 may request the host 200 to update the metadata during the second period B. However, this is merely an illustrative explanation, and example embodiments are not limited thereto. A person having ordinary skill in the technical field of the present disclosure may set various policies and standards for updating the first metadata META_H stored in the host memory 220.

Referring again to FIG. 7, the host controller 210 may receive the update request of metadata and provide the updated first metadata META_H to the host memory 220. For example, the host controller 210 may invalidate the first metadata META_H stored in the host memory 220 and update it to the updated first metadata META_H. For an illustrative description of the data program operation, reference is made to FIG. 9.

Figure 9:
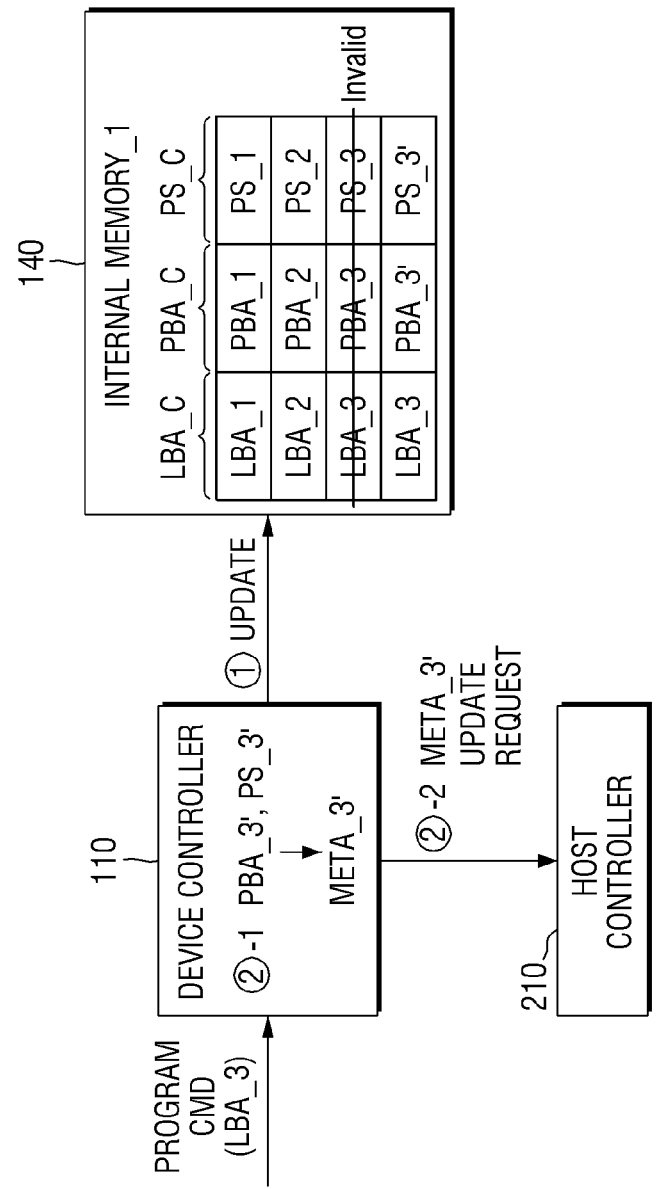
FIG. 9 is a diagram illustrating a data program operation of the data storage system according to an example embodiment.

FIG. 9 is a diagram illustrating a data program operation of the data storage system according to an example embodiment. Although FIG. 9 illustrates a state in which the operation of some constituent elements is omitted for the sake of convenience of explanation, the description will be provided with reference to FIG. 1 to complement this.

Referring to FIG. 9, the first internal memory 140 may include a second logical address LBA_C, a second physical address PBA_C, and second status information PS_C. The second logical address LBA_C may include a plurality of logical, for example, a logical address LBA_1, a logical address LBA_2 and a logical address LBA_3. The second physical address PBA_C may include a plurality of physical addresses, for example, a physical address PBA_1, a physical address PBA_2, a physical address PBA_3 and a physical address PBA_3'. The second status information PS_C may include a plurality of status information, for example, status information PS_1, status information PS_2, status information PS_3 and status information PS_3'. The physical address PBA_1, the physical address PBA_2, and the physical address PBA_3 may correspond to the logical address LBA_1, the logical address LBA_2, and the logical address LBA_3, respectively, and the physical address PBA_3' may also correspond to the logical address LBA_3. The status information PS_1, the status information PS_2, and the status information PS_3 may correspond to the logical address LBA_1, the logical address LBA_2 and the logical address LBA_3, respectively, and the status information PS_3' may also correspond to the logical address LBA_3.

Referring to FIGS. 1 and 9, the device controller 110 may receive a program command (PROGRAM CMD) of the logical address LBA_3. Upon receiving the program command (PROGRAM CMD) of the logical address LBA_3, the device controller 110 may allocate the logical address LBA_3 to the physical address PBA_3' to which the logical address is not allocated, and may program the data. At this time, the status information on the storage region of the first non-volatile memory 120 corresponding to the physical address PBA_3' may be the status information PS_3'. The device controller 110 may update the second physical address PBA_C and the second status information PS_C included in the first internal memory 140. That is, the device controller 110 may invalidate the existing physical address PBA_3 corresponding to the logical address LBA_3, and the status information PS_3, and may allocate the logical address LBA_3' and the status information PS_3' to the physical address PBA_3.

When the second physical address PBA_C corresponding to the second logical address LBA_C and the second status information PS_C are updated, the device controller 110 may request the host controller 210 to update the first metadata META_H. For example, the device controller 110 may generate the metadata META_3' by encrypting the physical address PBA_3' and the status information PS_3'. The device controller 110 may provide the metadata update request including the metadata META_3 to the host controller 210. The process of updating the metadata META_3' by the host controller 210 may be the same as or substantially similar to the process in which the device controller 110 allocates the physical address PBA_3' and the status information PS_3' to the logical address LBA_3.

Although FIGS. 7 to 9 do not illustrate the process of updating the first physical address PBA_S and the first status information PS_S stored in the second non-volatile memory 130, a person having ordinary knowledge in the technical field of the present disclosure may implement a process of updating the first physical address PBA_S and the first status information PS_S stored in the second non-volatile memory 130 in the same or substantially similar manner as described above with regard to the process of updating the second physical address PBA_C and the second status information PS_C included in the first internal memory 140. Updating of the first physical address PBA_S and the first status information PS_S stored in the second non-volatile memory 130 may be appropriately set, depending on the policy or convenience of the data storage device 100.

Figure 10:
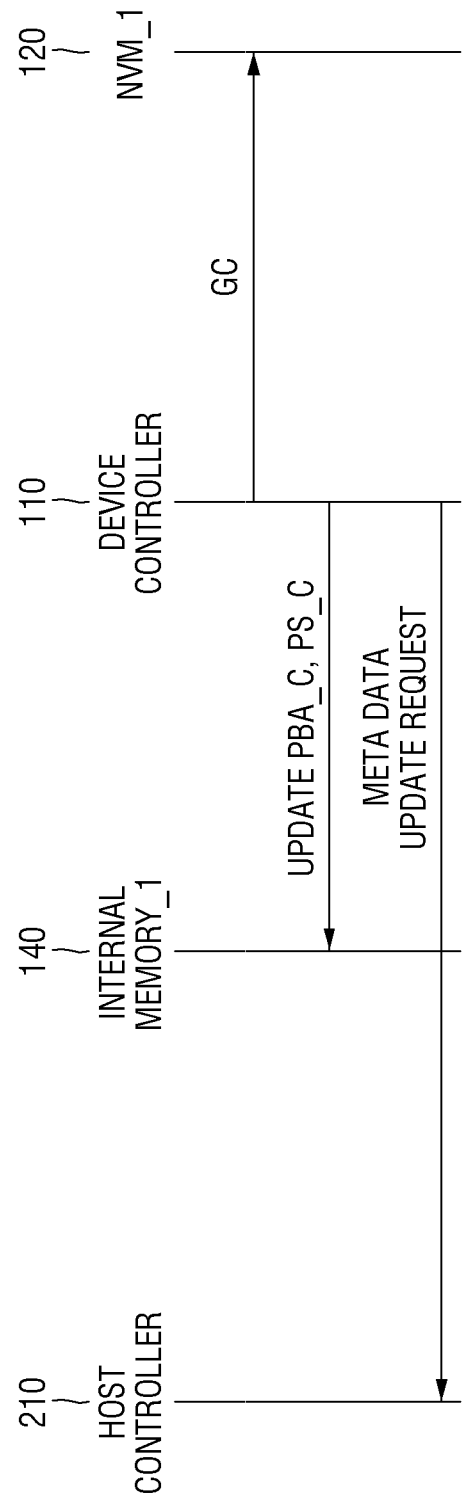
FIG. 10 is a diagram for explaining an operation of data garbage collection (GC) of the storage device according to an example embodiment.

FIG. 10 is a diagram for explaining an operation of data garbage collection (GC) of the storage device according to an example embodiment. Although FIG. 10 illustrates a state in which the operation of some constituent elements is omitted for the sake of convenience of explanation, the description will be provided with reference to FIG. 1 to complement this.

Referring to FIG. 10, the device controller 110 may control the garbage collection operation of the first non-volatile memory 120. When the garbage collection operation is executed in the first non-volatile memory 120, at least one of relationships between the logical address, the physical address, and the status information of the first non-volatile memory changes. Thus, the device controller 110 may need to update the second physical address PBA_C and the second status information PS_C in the first internal memory 140. Because the subsequent operations are similar to the program operation of the data storage device 100 described with reference to FIGS. 7 to 9, description thereof will not be provided.

Figure 11:
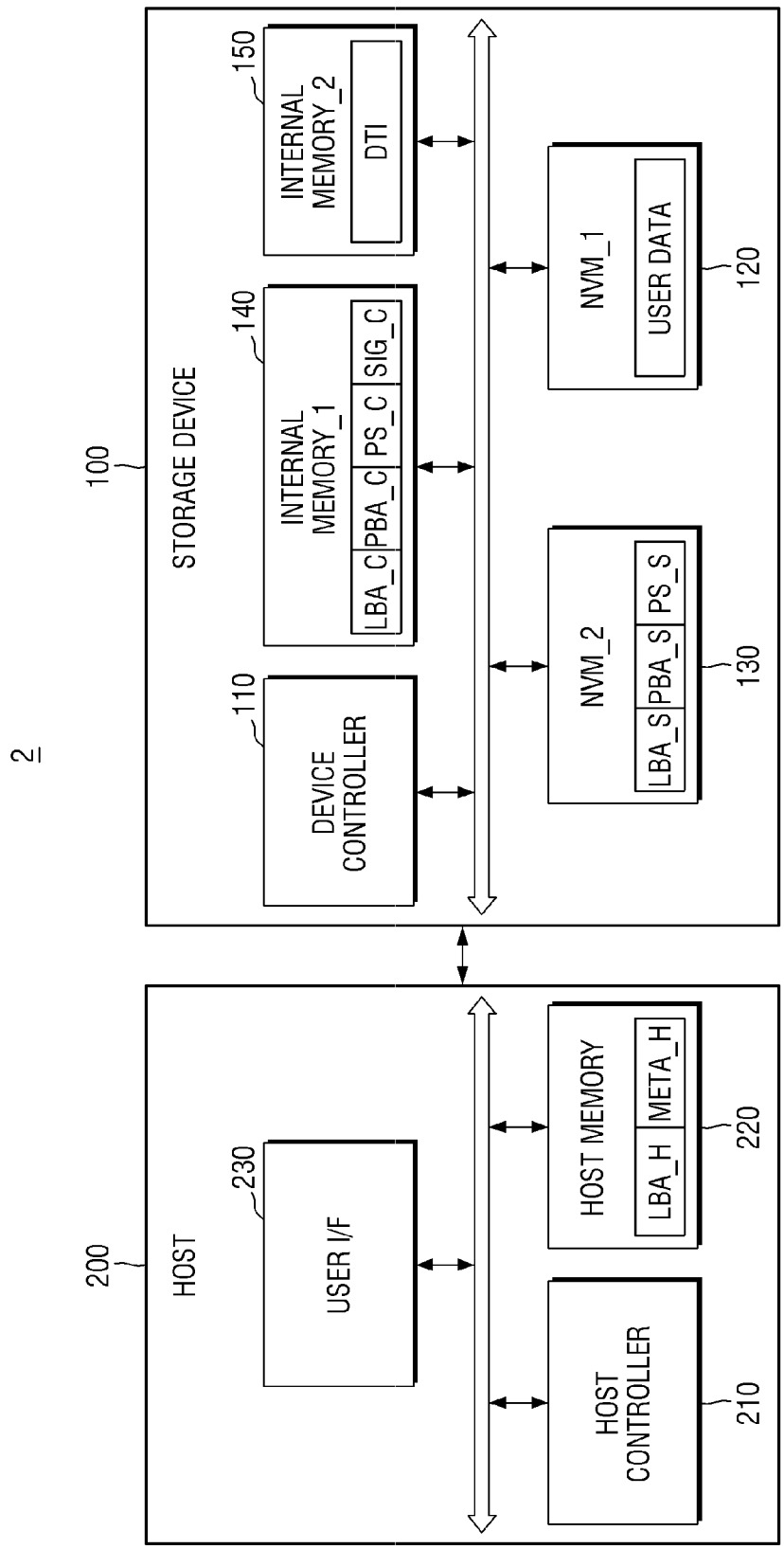
FIG. 11 is a diagram for explaining a data storage system according to an example embodiment.

FIG. 11 is a diagram for explaining a data storage system according to an example embodiment. For the sake of convenience of explanation, differences from the contents described above with reference to FIGS. 1 to 10 will be mainly described, and repeated or similar contents of the above description will be omitted or briefly explained.

Referring to FIG. 11, the data storage system 2 may include a data storage device 100 and a host 200.

The data storage device 100 may include a device controller 110, a first non-volatile memory 120, a second non-volatile memory 130, a first internal memory 140, and a second internal memory 150. The host 200 may include a host controller 210, a host memory 220, and a user interface 230.

The first internal memory 140 may include a second logical address LBA_C, a second physical address PBA_C, second status information PS_C and second signature information SIG_C. The second signature information SIG_C according to some example embodiments may be information related to validity of the first metadata META_H stored in the host memory 220. For example, the second signature information SIG_C may be information on the updating of the second physical address PBA_C and the second status information PS_C. That is, the device controller 110 may determine the validity of the first metadata META_H stored in the host memory 220, using the second signature information SIG_C. The first metadata META_H will be described referring to FIG. 12.

Figure 12:
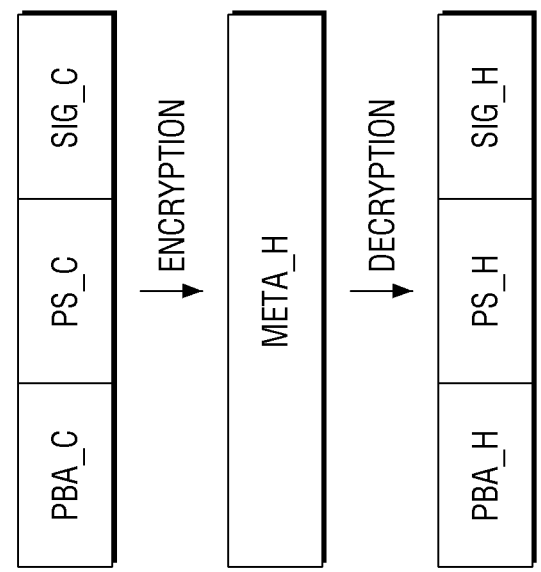
FIG. 12 is a diagram illustrating a relation between the first metadata, the second physical address, the second status information, the third physical address, the third status information, the first signature information, and the second signature information, according to an example embodiment.

FIG. 12 is a diagram illustrating a relationship between the first metadata, the second physical address, the second status information, the third physical address, the third status information, the first signature information, and the second signature information, according to an example embodiment.

Referring to FIGS. 11 and 12, the device controller 110 of the data storage device 100 according to some example embodiments may encrypt the second physical address PBA_C, the second status information PS_C, and the second signature information SIG_C to generate the first metadata META_H. For example, the device controller 110 may scramble the second physical address PBA_C, the second status information PS_C, and the second signature information SIG_C to generate the first metadata META_H. On the other hand, the device controller 110 may decrypt the first metadata META_H to generate the third physical address PBA_H, the third status information PS_H, and the first signature information SIG_H. For example, the device controller 110 may descramble the first metadata META_H to generate the third physical address PBA_H, the third status information PS_H and the first signature information SIG_H. Hereinafter, the read operation, the program operation, and the garbage collection operation of the data storage system 2 using the first signature information SIG_H and the second signature information SIG_C will be described.

Figure 13:
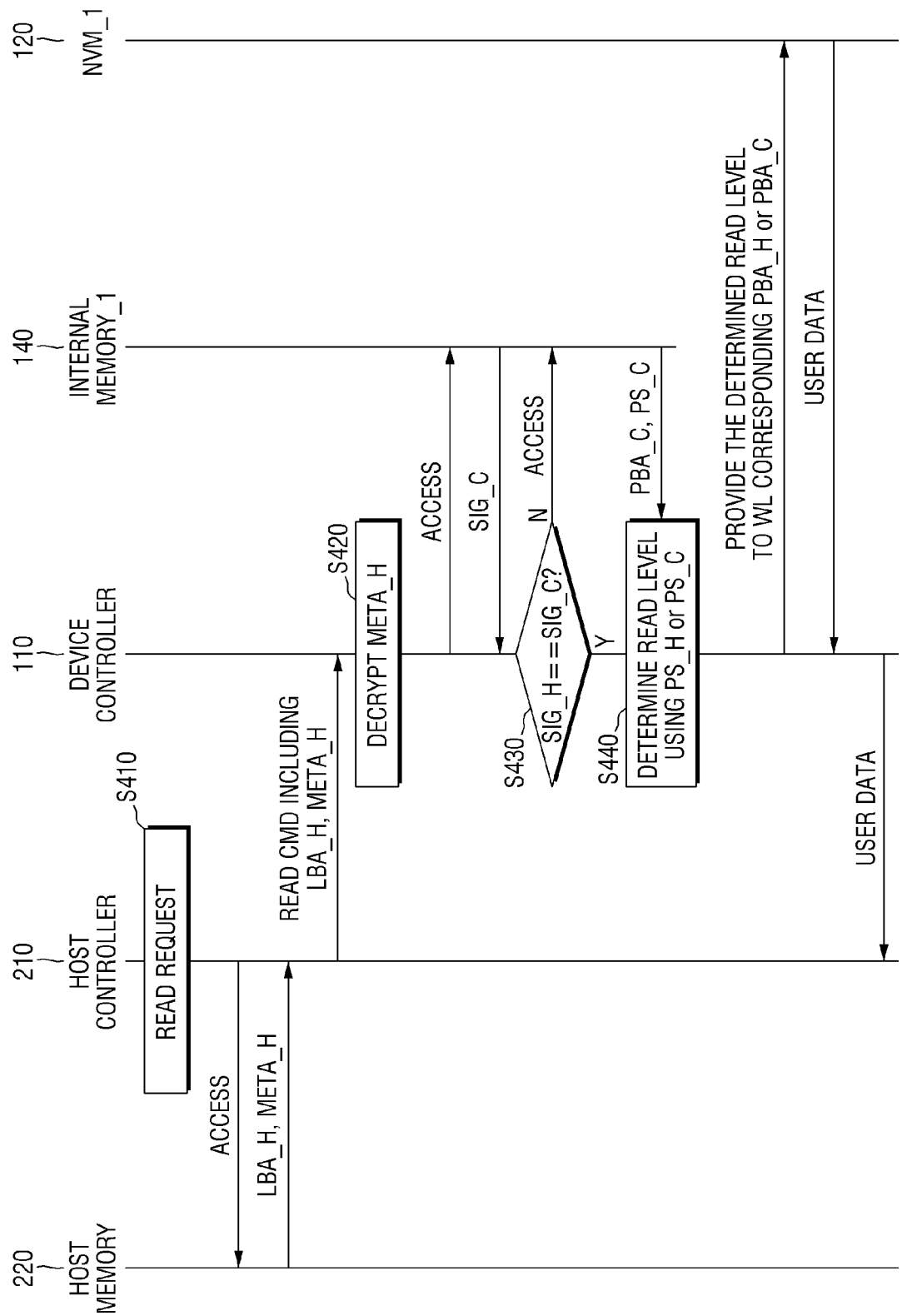
FIG. 13 is a diagram for explaining the data read operation of the data storage system according to an example embodiment.

FIG. 13 is a diagram for explaining the data read operation of the data storage system according to an example embodiment. Although FIG. 13 illustrates a state in which the operation of some constituent elements is omitted for convenience of explanation, the description will be provided with reference to FIG. 11 to complement this. Further, for convenience of explanation, repeated or similar contents of the above description will be omitted or briefly explained.

Referring to FIGS. 11 and 13, the host controller 210 may receive a data read request (S410). Upon receiving the data read request, the host controller 210 may access the host memory 220 to load the third logical address LBA_H and the first metadata META_H. The host controller 210 may provide the data read command (READ CMD) including the third logical address LBA_H and the first metadata META_H to the data storage device 100. The data read command (READ CMD) including the third logical address LBA_H and the first metadata META_H may be provided to the device controller 110.

The device controller 110 may decrypt the first metadata META_H included in the received data read command to generate a third physical address PBA_H, third status information PS_H, and first signature Information SIG_H (S420).

The device controller 110 may access the first internal memory 140 to load the second signature information SIG_C stored in the first internal memory 140. According to some example embodiments, the device controller 110 may load only the second signature information SIG_C stored in the first internal memory 140 to inspect the validity of the first metadata META_H, that is, the validity of the third physical address PBA_H and the third status information PS_H.

The device controller 110 may compare whether the first signature information SIG_H generated by decrypting the first metadata META_H is the same as the second signature information SIG_C loaded from the first internal memory 140 (S430).

When the first signature information SIG_H is the same as the second signature information SIG_C (S430, Y), the device controller 110 may determine the first read level using the third status information PS_H (S440). For example, when the first signature information SIG_H is the same as the second signature information SIG_C, the device controller 110 may access the second internal memory 150 to determine the read level determination information DTI, and may determine the first read level using the third status information PS_H and the read level determination information DTI. The device controller 110 may read the user data (USER DATA) stored in the third physical address PBA_H of the first non-volatile memory 120 using the determined first read level. For example, the device controller 110 may read the user data (USER DATA) stored in the third physical address PBA_H of the first non-volatile memory 120, by applying the determined voltage of the first read level to the word line of the first non-volatile memory 120 corresponding to the third physical address PBA_H.

When the first signature information SIG_H and the second signature information SIG_C are different from each other (S430, N), the device controller 110 may access the first internal memory 140 to load the second physical address PBA_C and the second status information PS_C. The device controller 110 may determine the first read level using the loaded second status information PS_C, identically or substantially similarly to the process described above (S440). The device controller 110 may read the user data (USER DATA) stored in the second physical address PBA_C of the first non-volatile memory 120, using the determined first read level. For example, the device controller 110 may read the user data (USER DATA) stored in the second physical address PBA_C of the first non-volatile memory 120, by applying the determined voltage of the first read level to the word line of the first non-volatile memory 120 corresponding to the second physical address PBA_C.

The device controller 110 may provide the read user data (USER DATA) to the host 200, and the host controller 210 may receive the user data. For an illustrative description of the data read operation, reference is made to FIGS. 14 and 15.

Figure 14:
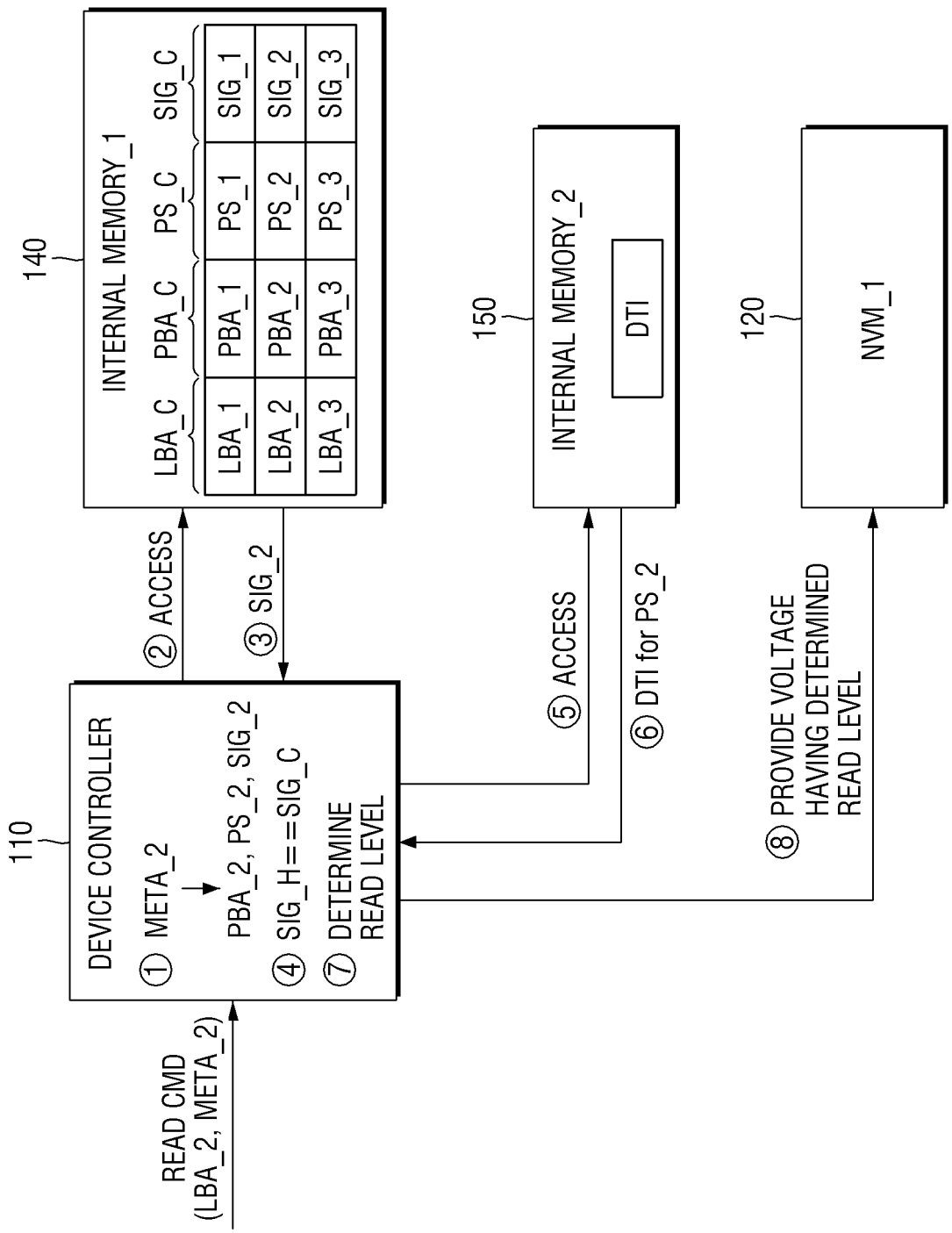
FIG. 14 is a diagram for explaining a data read operation of the data storage system when the first signature information and the second signature information are identical to each other, according to an example embodiment.
Figure 15:
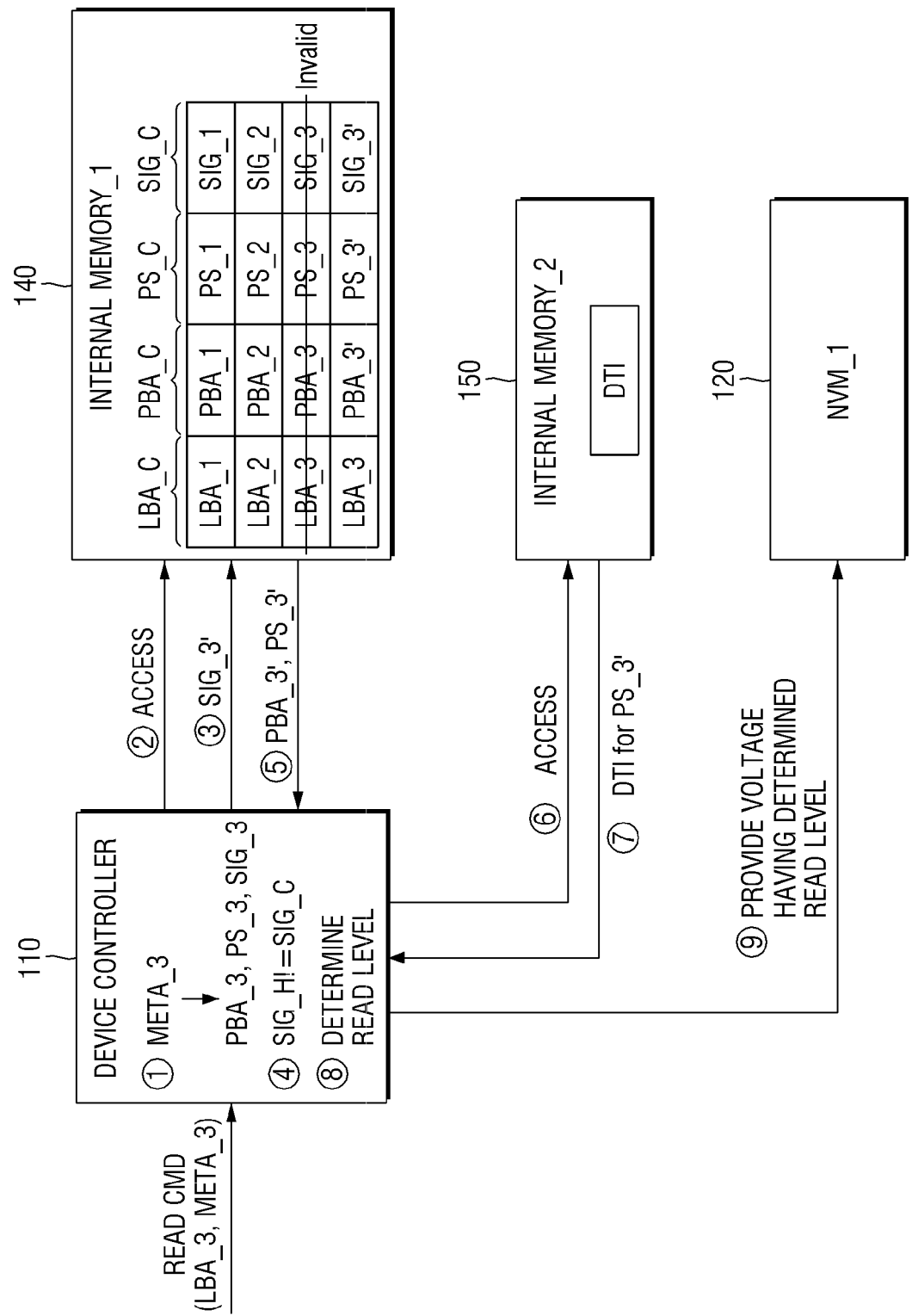
FIG. 15 is a diagram for explaining a data read operation of the data storage system when the first signature information and the second signature information are different from each other, according to an example embodiment.

FIG. 14 is a diagram for explaining a data read operation of the data storage system when the first signature information and the second signature information are identical to each other, according to an example embodiment. FIG. 15 is a diagram for explaining a data read operation of the data storage system when the first signature information and the second signature information are different from each other, according to an example embodiment. Although FIGS. 14 and 15 illustrate a state in which the operation of some constituent elements is omitted for the sake of convenience of explanation, the description will be provided with reference to FIG. 11 to complement this. Further, for the sake of convenience of explanation, repeated or similar contents of the above description will be omitted or briefly explained.

Referring to FIGS. 11 and 14, the device controller 110 may receive the data read command (READ CMD) including the logical address LBA_2 and the metadata META_2.

The device controller 110 may decrypt the received metadata META_2 to generate the physical address PBA_2, the status information PS_2, and the signature information SIG_2. The signature information SIG_2 may be information on the validity of the physical address PBA_2 and the status information PS_2 decrypted from the metadata META_2. The device controller 110 may access the first internal memory 140 to load the signature information SIG_2. By comparing the signature information SIG_2 (e.g., the first signature information SIG_H) generated by decrypting the metadata META_2 with the signature information SIG_2 (e.g., the second signature information SIG_C) loaded from the first internal memory 140, the device controller 110 may make a decision that the signature information SIG_2 generated by decrypting the metadata META_2 and the signature information SIG_2 loaded from the first internal memory 140 are the same. In this case, the device controller 110 may access the second internal memory 150 to load the read level determination information DTI on the status information PS_2. The device controller 110 may determine the first read level using the status information PS_2 and the read level determination information DTI. The device controller 110 may provide the voltage of the first read level to the first non-volatile memory 120 to read the data stored in the physical address PBA_2.

Referring to FIGS. 11 and 15, the device controller 110 may receive the data read command (READ CMD) including the logical address LBA_3 and the metadata META_3.

The device controller 110 may decrypt the received metadata META_3 to generate the physical address PBA_3, the status information PS_3, and the signature information SIG_3. The device controller 110 may access the first internal memory 140 to load the signature information SIG_3'. By comparing the signature information SIG_3 (i.e., the first signature information SIG_H) generated by decrypting the metadata META_3 with the signature information SIG_3' (e.g., the second signature information SIG_C) loaded from the first internal memory 140, the device controller 110 may make a decision that the signature information SIG_3 and the signature information SIG_3' are different from each other. In this case, the device controller 110 may load the physical address PBA_3' and the status information PS_3' corresponding to the logical address LBA_3 from the first internal memory 140. The device controller 110 may access the second internal memory 150 to load the read level determination information DTI on the status information PS_3'. The device controller 110 may determine the first read level using the status information PS_3' and the read level determination information DTI. The device controller 110 may provide the voltage of the first read level to the first non-volatile memory 120 to read the data stored in the physical address PBA_3'.

Figure 16:
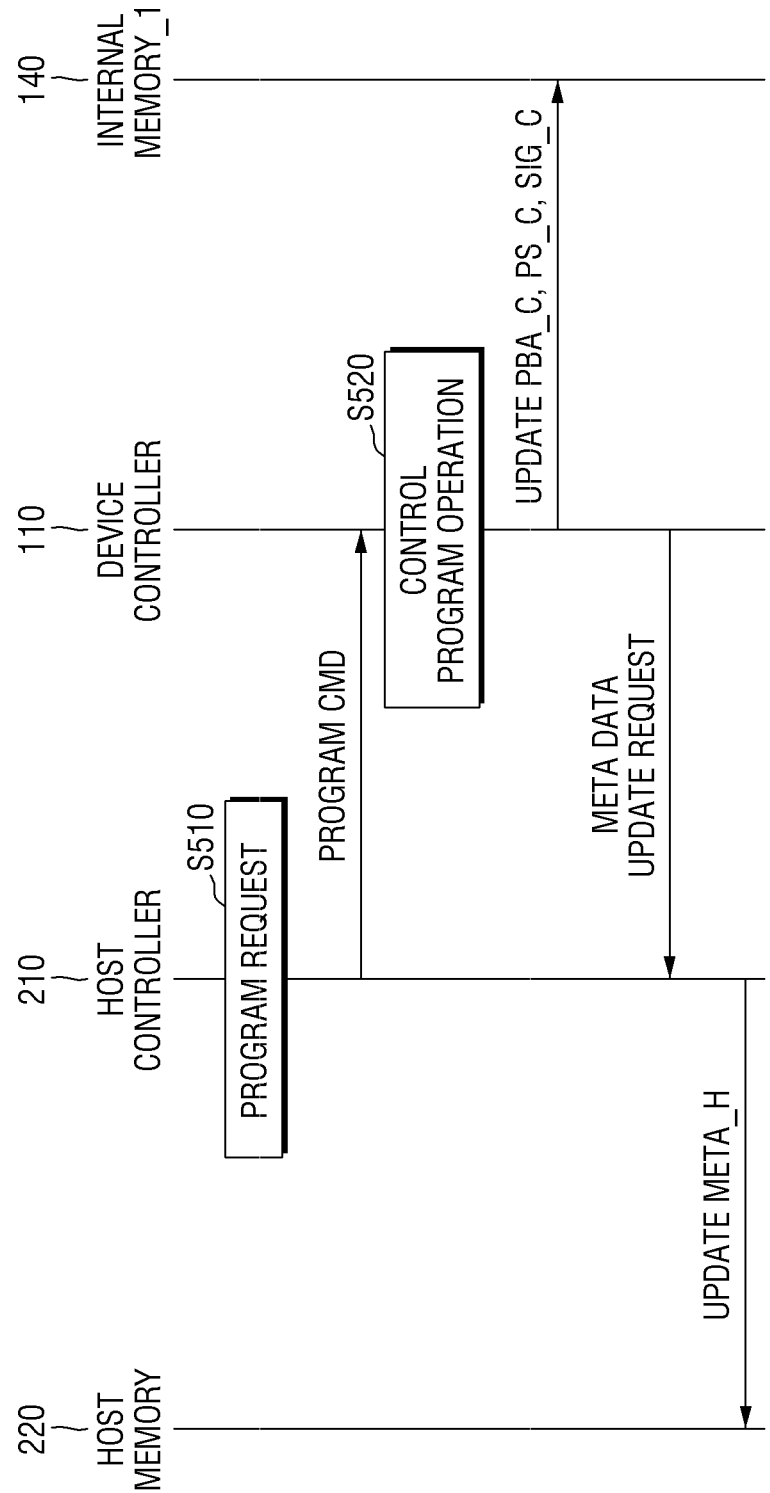
FIG. 16 is a diagram for explaining a data program operation of the data storage system according to an example embodiment.

FIG. 16 is a diagram for explaining a data program operation of the data storage system according to an example embodiment. Although FIG. 16 illustrates a state in which the operation of some constituent elements is omitted for convenience of explanation, the description will be provided with reference to FIG. 11 to complement this. Further, for convenience of explanation, repeated or similar contents of the above description will be omitted or briefly explained.

Referring to FIGS. 11 and 16, the host controller 210 may receive a program request (S510) and provide a program command (PROGRAM CMD) to the data storage device 100. The device controller 110 may control the program operation in accordance with the received program command (PROGRAM CMD), and may update the second physical address PBA_C, the second status information PS_C and the second signature information SIG_C stored in the first internal memory 140. The device controller 110 may request the host 200 to update the first metadata META_H. When updating of the first metadata META_H is requested, the host controller 210 may update the first metadata META_H stored in the host memory 220. According to some example embodiments, when the first metadata META_H is updated, the first signature information SIG_H and the second signature information SIG_C may be the same. On the other hand, when the second physical address PBA_C and the second status information PS_C are updated, and the first metadata META_H is not updated, the first signature information SIG_H and the second signature information SIG_C may be different from each other.

In some example embodiments, the description is provided such that the device controller 110 also updates the second signature information SIG_C when updating the second physical address PBA_C and the second status information PS_C stored in the first internal memory 140, but example embodiments are not limited thereto. A person having ordinary skill in the technical field of the present disclosure may set various methods and policies for updating the second signature information SIG_C.

Figure 17:
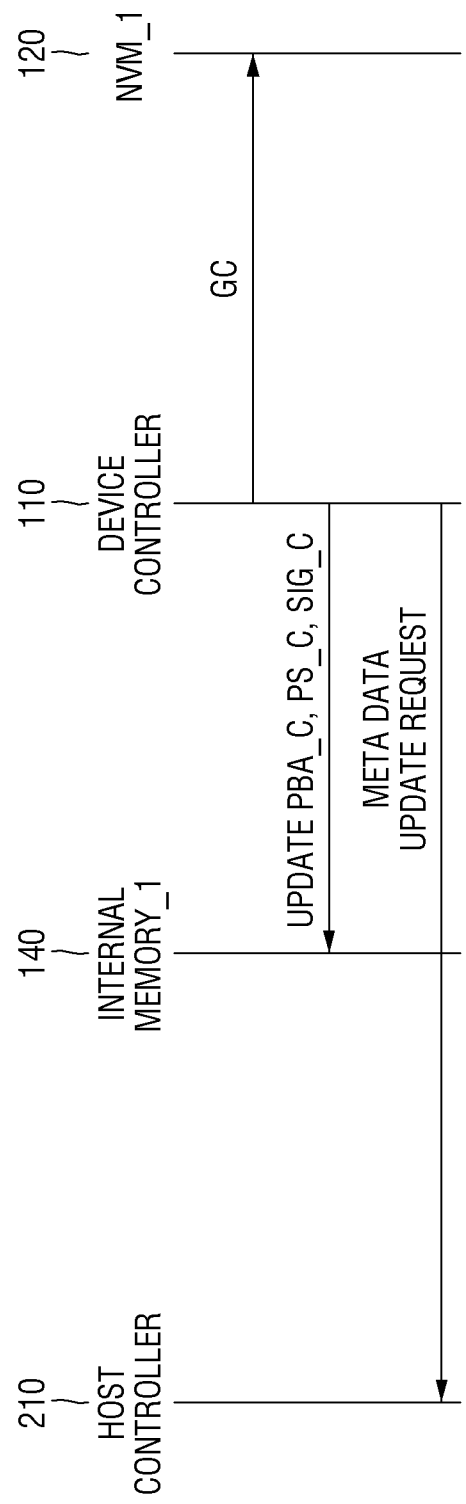
FIG. 17 is a diagram for explaining the data garbage collection operation of the data storage device according to an example embodiment.

FIG. 17 is a diagram for explaining the data garbage collection operation of the data storage device according to an example embodiment. Although FIG. 17 illustrates a state in which the operation of some constituent elements is omitted for convenience of explanation, the description will be provided with reference to FIG. 11 to complement this. Further, for convenience of explanation, repeated or similar contents of the above description will be omitted or briefly explained.

Referring to FIGS. 11 and 17, the device controller 110 may control the garbage collection operation of the first non-volatile memory 120. When the garbage collection operation is executed in the first non-volatile memory 120, since at least one of the relationships between the logical address, the physical address, and the status information of the first non-volatile memory is changed, the device controller 110 may update the second physical address PBA_C, the second status information PS_C and the second signature information SIG_C in the first internal memory 140. The subsequent operations are similar to the program operation of the data storage device 100 described with reference to FIG. 16, thus a related description thereof will not be provided.

In concluding the detailed description, those skilled in the art will appreciate that many variations and modifications may be made to the disclosed example embodiments without substantially departing from the principles of the present disclosure. Therefore, the disclosed example embodiments of the inventive concepts are used in a generic and descriptive sense only and not for purposes of limitation.

What is claimed is:

1. A data storage device comprising:
a first non-volatile memory configured to store data;
a first internal memory configured to store a second logical address of the first non-volatile memory, a second physical address corresponding to the second logical address, and second status information of the first non-volatile memory corresponding to the second physical address;
a second non-volatile memory configured to store a third logical address of the first non-volatile memory, a third physical address corresponding to the third logical address, and a third status information of the first non-volatile memory corresponding to the third physical address; and
a device controller configured to control the first non-volatile memory,
wherein the device controller is configured to,
receive a data read command including a first logical address of the first non-volatile memory, a first physical address corresponding to the first logical address, and first status information of the first non-volatile memory corresponding to the first physical address,
determine a first read level based on the first status information included in the data read command and read level determination information, the read level determination information including relationship information between status information of the first non-volatile memory and a read voltage variation corresponding thereto,
apply a voltage of the first read level to a first word line of the first non-volatile memory corresponding to the first physical address to read data,
load and store at least a part of the third logical address, the third physical address, and the third status information in the first internal memory as the second logical address, the second physical address and the second status information, respectively, and
provide the second logical address, the second physical address, and the second status information stored in the first internal memory to outside.

2. The data storage device of claim 1, wherein the first physical address and the first status information included in the data read command are encrypted.

3. The data storage device of claim 2, wherein
the device controller is configured to determine the first read level based on the first status information included in the data read command by decrypting the encrypted first status information, and
the device controller is configured to apply the voltage of the first read level to the first word line of the first non-volatile memory corresponding to the first physical address by decrypting the encrypted first physical address.

4. The data storage device of claim 1, wherein the first non-volatile memory is included in a multi-level cell (MLC) region of a flash memory, and the second non-volatile memory is included in a single level cell (SLC) region of the flash memory.

5. The data storage device of claim 1, wherein the first non-volatile memory is a flash memory and the second non-volatile memory is a magneto-resistive memory (MRAM).

6. The data storage device of claim 1, wherein the device controller is further configured to provide the second logical address, the second physical address, and the second status information that are stored in the first internal memory to the outside by,
- encrypting the second physical address and the second status information to generate first metadata, and
- providing the second logical address and the first metadata to the outside.

7. The data storage device of claim 1, wherein the first internal memory is further configured to store first signature information on validity of the first logical address, the first physical address, and the first status information.

8. The data storage device of claim 1, the data read command further comprises first signature information on validity of the first logical address, the first physical address and the first status information.

9. The data storage device of claim 1, further comprising:
- a second internal memory configured to store the read level determination information used by the device controller to determine the first read level.

10. The data storage device of claim 9, wherein the device controller is configured to determine the first read level using the first status information included in the data read command and the read level determination information by,
- accessing the second internal memory to load the read level determination information, and
- determining the first read level using the first status information and the read level determination information.

11. The data storage device of claim 1, wherein the read level determination information is a look up table.

* * * * *